Sept. 1, 1970      S. DICKFELDT ET AL      3,526,822
STORAGE BATTERY CELL AND STORAGE BATTERY
Filed Dec. 6, 1966      3 Sheets-Sheet 1
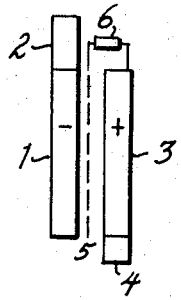
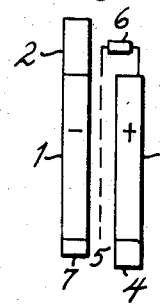
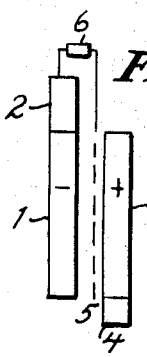
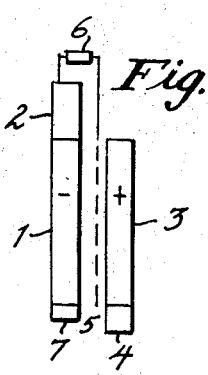
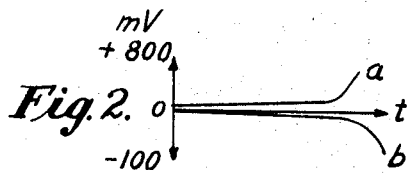
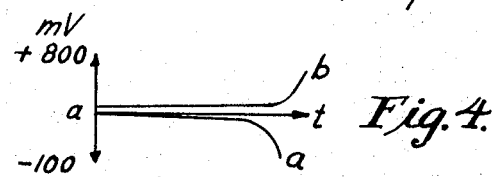
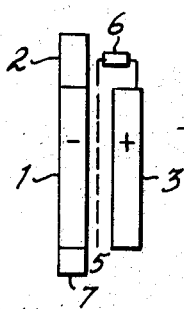
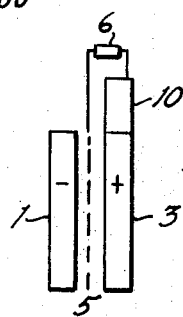
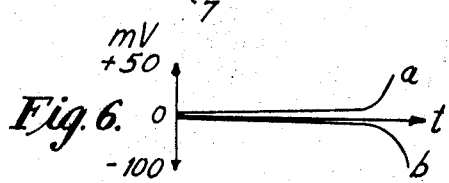
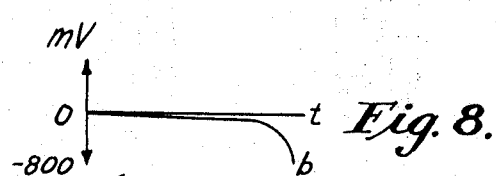
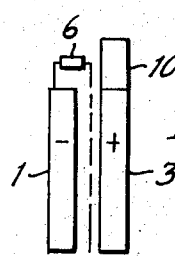
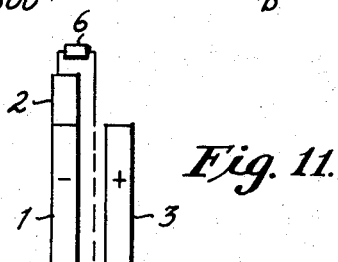
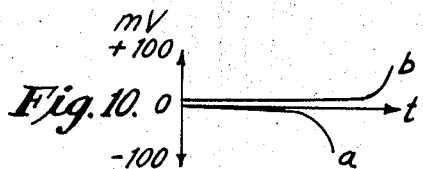
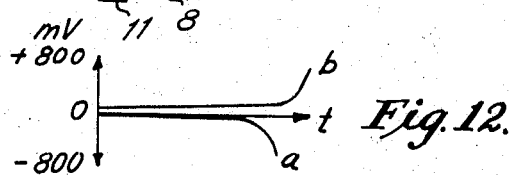
INVENTORS.
SIEGFRIED DICKFELDT
FREIMUT PETERS
BY
ATTORNEY.

Sept. 1, 1970   S. DICKFELDT ET AL   3,526,822
STORAGE BATTERY CELL AND STORAGE BATTERY
Filed Dec. 6, 1966   3 Sheets-Sheet 2
*Fig. 13.*
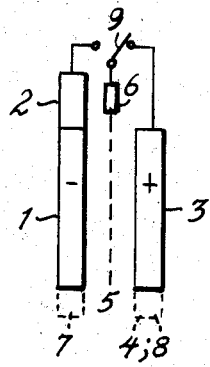
*Fig. 15.*
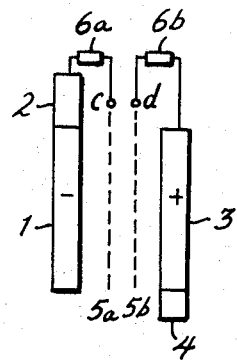
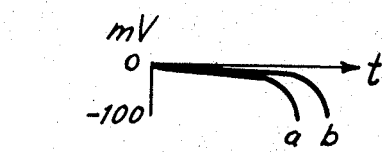
*Fig. 14.*
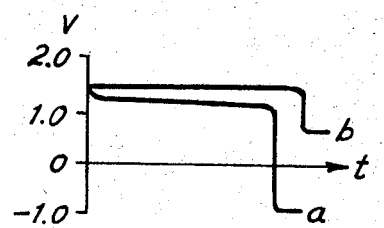
*Fig. 16.*
*Fig. 17.*
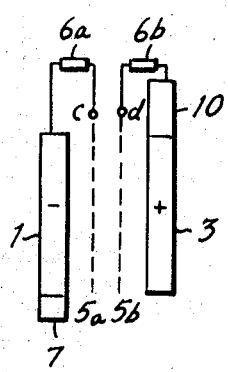
*Fig. 18.*
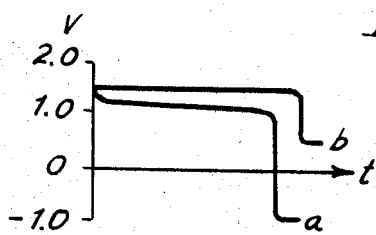
INVENTORS
SIEGFRIED DICKFELDT
FREIMUT PETERS
BY
ATTORNEY.

United States Patent Office 3,526,822
Patented Sept. 1, 1970

3,526,822
STORAGE BATTERY CELL AND STORAGE BATTERY
Siegfried Dickfeldt, Hagen-Haspe, Westphalia, and Freimut Peters, Hagen, Westphalia, Germany, assignors to Varta Aktiengesellschaft, Frankfurt am Main, Germany, a corporation of Germany
Filed Dec. 6, 1966, Ser. No. 599,441
Claims priority, application Germany, Dec. 10, 1965, V 29,883
Int. Cl. H01m 45/04
U.S. Cl. 320—14                                  25 Claims

ABSTRACT OF THE DISCLOSURE

A storage battery cell comprising in combination therewith a device for controlling the charge and discharge cycle of the battery. The device includes an inert control electrode, whose resistance is independent of the state of charge of the main electrode, which is electrically connectable in various ways to the main electrodes over electrical circuit means at which there is established a potential difference at the end of each charge and discharge cycle; this potential actuates control of the charge and discharge cycles.

---

Figure 19:
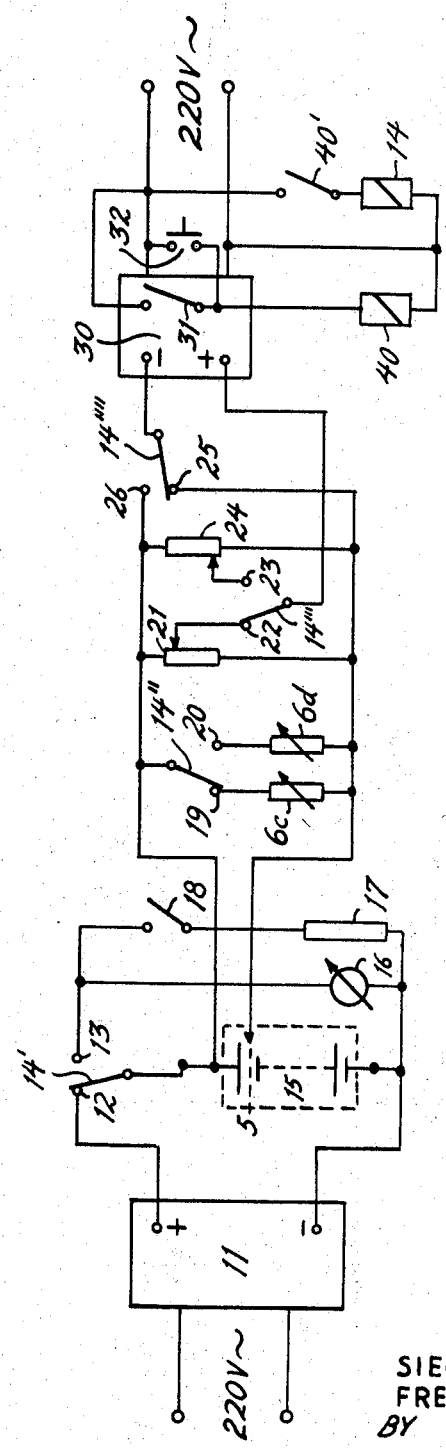

The present invention relates to a storage battery cell which contains, in addition to the main electrodes, at least one control electrode which responds to the charge condition of the storage battery cell.

The control electrode used in the invention operates bifunctionally, i.e., oxidation reactions as well as reducing reactions may take place at this electrode. The main electrodes are, with respect to their capacity and their condition of charge, adjusted in their function to the control electrodes to which they are electrically connected in such manner that at the end of the discharge cycle or charge cycle, respectively, a difference in the potentials is established, which serves for the control of a switching device. The invention concerns furthermore a switching device and a switching circuit which controls, in a storage battery of the type described and comprising at least one control electrode, the charging and discharging of the storage battery cell.

The problems and difficulties in the charging and discharging of electrical devices are numerous. In the course of charging a storage battery, for instance, the charged amount of current should generally be in a determinable ratio with respect to the discharged amount of current. This means that the "charge factor" should not exceed a certain value if one is interested in the greatest possible durability and in a long life of the storage battery and cells.

Moreover, in operations involving the so-called floating battery in which the charge is maintained and in which the charging is carried out for long periods of time, the final current loads must not exceed certain limiting values.

Also in the discharge of gas-tight storage batteries which require a minimum of service, one generally attempts to minimize, in order to achieve a long life, long-lasting deep discharges which may result in a change of polarity of one or more cells of the storage battery.

Especially great difficulties are encountered in the charging of gas-tight storage batteries. If the charging is carried out with a constant current and one attempt to achieve a complete charge in the shortest possible time, it is necessary to operate with timing devices in order to avoid overcharging of the battery. This results from the fact that gas-tight cells, e.g., of the nickel cadmium type, do not show, at the point of beginning gas generation, a marked change of the charge potential that could serve as a warning of overcharging. Moreover, the maintenance of a predetermined charge factor from cycle to cycle during the time of the charging is often difficult because the amount of current which has been taken out prior to charging, or which has been lost as a result of self-discharge during rest periods, is not always known. Hence, it is not possible to avoid overcharging in those cases where timing devices are employed by simply setting the timing device for a time or length of charge which is proportional to the amount of current which has been used or lost. Thus, even with the use of timing devices there is the danger that the battery is not fully charged or that it is overcharged.

In the course of charging lead storage batteries and open-operated alkaline batteries, the increase of potential which occurs at the end of the charging cycle as the result of beginning gas generation at the positive or negative electrodes, respectively, is often utilized to perform the control or switching operations to terminate the charging process or to reduce the charging current to a level at which damaging overcharging does not occur. The control is achieved thereby without the use of a third or auxiliary electrode. When gas-tight cells are charged with a constant charge potential, the discharge conditions of the cells or batteries can be approximated because in this case the charge current decreases as a result of the increasing counter potential of the cells.

If the charging is effected at normal temperature conditions, no particular difficulties are encountered. The charging of gas-tight cells at constant potential and at increased temperatures of the cells or of the surroundings (where the operations are performed) is, however, not without difficulties. The cell heats up further when the gas generation starts in the cell. At the same time, the increased temperature or the heating up, respectively, decrease the counter potential of the cell. This results in turn, at a constant outer charge potential, in an increase of the charge current which produces a further heating up or increase of the temperature of the cell, respectively. Eventually, as a result of "run-away," the cell can be destroyed by overheating and excessive gas generation.

In practice also it is not possible to charge a gas-tight battery cell by a charge at constant voltage in one or two hours, and continue the remaining charge with a residual charge current which has been lowered enough to present no risk at an extended period of charge.

The discharge of storage battery cells should, in general, not be carried to the point where the discharge voltage falls below a certain predetermined voltage. It is also desirable to avoid extended discharge with reversal of polarity for any longer period of time because in some systems, for instance in the lead storage battery, this may result in irreversible processes. Furthermore, in open cells extended discharge with reversal of the polarity of the plates produces, as the result of gas generation, an additional loss of electrolyte. An extended discharge can result in the complete destruction of the housing of gas-tight cells as a result of the gas pressure build-up. To prevent this from occurring the positive electrode of gas-tight cells is provided, for instance, with a so-called antipolar mass which adjusts the potential of the originally positive electrode, after the exhaustion of the regular material of which it is made, to a certain predetermined value which is particularly favorable for the reduction of the gaseous oxygen.

However, for this measure to be effective it is required that the discharge current does not exceed a predetermined value. With discharge currents exceeding this value, and resulting in excessive gas generation, the total reactivity of the positive electrode which is provided with the "antipolar mass," and which works now as a cathode, is insufficient. Thus, even using such measure, the gas pressure often builds up and deforms or destroys the housing of the cell or battery.

In view of the difficulties of the prior art as described above, it is of course common to provide all possible safely precautions against a damaging overcharge. In this connection, it is known to provide in the storage battery cells so-called auxiliary electrodes or control electrodes. Such auxiliary electrodes have generally for purpose the absorption of hydrogen or oxygen. To this effect they are only partially immersed in the electrolyte and are in contact with the gas space of the cells. In order to maintain the auxiliary electrodes at a potential which is most favorable for the absorption effect, they are electrically connected with the main electrode over resistors or diodes. Or, if desired, constant voltage may be provided from outside between the auxiliary electrode and the main electrode.

It is also known to connect gas-consuming electrodes, which are located for the major part in the gas space over a relay with the negative main electrodes. The current flowing as a result of the electrochemical reduction of the oxygen in the gas space through the relay effects the shut-off of the charge current.

The disadvantages of this arrangement are the strict dependency of the potential between the auxiliary electrode and the main electrode on temperature changes, and the space requirements of the additional gas space. The known auxiliary electrodes require a large surface and a correspondingly large space in order to provide a satisfactory absorption effect. As a result, a cell containing the said auxiliary electrode has, at equal dimensions, a smaller capacity than a regular cell.

A controlling effect can be achieved with the said known auxiliary electrodes only during the charging because they work principally only as oxygen consuming electrodes. Equally important for the increase of the life of the cell is of course also the control of the discharge.

The state of and the difficulties encountered in the prior art in this field can be appreciated by a study of U.S. Pats. 2,104,973; 2,578,027; 2,857,447; 3,080,440, for instance, which are incorporated herein by reference.

It is therefore an object of the present invention to provide a storage battery cell or storage battery which comprises a control electrode which operates bifunctionally so as to provide a safe limitation in the charging as well as in the discharging cycles of the storage battery. More specifically the present invention provides also a storage battery cell which comprises a pair of bifunctional control electrodes.

The term "bifunctional" as used herein in connection with the term "control electrode" is intended to mean that the control electrode is in electrical relationship with a regular electrode. The bifunctional control electrode is adapted to accommodate an electro-chemical oxidation reaction if it is anodically polarized, and an electrochemical reduction reaction if it is cathodically polarized. Examples of such bifunctions are:

Oxidation-gas generation/reduction of oxygen gas; and oxidation of hydrogen-gas/hydrogen-gas generation. Further examples are provided in the following description of the invention.

In order to permit the control electrode to work bifunctionally, the capacities and charge states of the regular electrodes are regulated in accordance with the invention to the function of the control electrodes in a novel manner. It was found, in a further embodiment of the invention, that in some cases the addition of "antipolar mass" to the material from which the electrodes are made yields further advantages. The adjustment of the capacities and states of charge of the main electrodes to the particular control electrode makes it possible that the control electrode operates as a bifunctional control electrode in accordance with the invention.

The control electrodes used in the present invention comprise thin foils, webs or sinter foils of electrically conducting materials which are inert and which are not corroded under the operating conditions of the storage battery. In the case of alkaline storage batteries, they are preferably made from nickel. The auxiliary electrodes are provided in a space-saving manner between the main electrodes and are surrounded by one of the conventional separators such as rubber, cellulosic, sintered or not. They are electrically connected to the main electrodes over resistors or other suitable circuit elements. The voltage drops occurring at these resistors at the end of the charging or discharging cycle reduce or break the charge or discharge current, respectively, over suitable switching devices and circuits, which will be described hereinafter.

The present invention provides a storage battery cell which comprises, besides the main electrodes, at least one control electrode which responds to the state of charge of the storage battery cell. The main electrodes are adjusted with respect to their capacities and their charge to the function of the bifunctional control electrode or electrodes, respectively, with which they are electrically connected, in such manner that at the end of the charging or discharging cycle a potential difference establishes itself between the main electrodes and the control electrodes, and this differential in potential is utilized for the control of a switching device.

If the storage battery cell contains one bifunctional control electrode, the latter may be electrically connected either to the positive electrode or to the negative electrode. Advantageously, the storage battery cell contains two bifunctional control electrodes, one of which is electrically connected to the positive electrode and the other is electrically connected to the negative electrode.

If the storage battery cell contains one single control electrode, which is electrically connected to the positive electrode, the negative electrode may be advantageously provided with a "charge reserve" and the positive electrode may be provided with an additional of antipolar mass.

With the last described arrangement, the negative electrode may advantageously be provided with an additional "discharge reserve" which equals or is smaller than the reducing capacity of the antipolar mass addition to the positive electrode.

In another embodiment of the storage battery of the present invention, the control electrode is electrically connected to the negative electrode, whereby the negative electrode has a "charge reserve" and the positive electrode is provided with an additional of antipolar mass. In this embodiment of the storage battery cell of the invention, the positive electrode may also contain a "discharge reserve" instead of the antipolar mass.

In still another embodiment of the storage battery cell of the present invention, the control electrode is electrically connected to the positive electrode and the negative electrode contains a "charge reserve" and a "discharge reserve."

In the embodiment of the storage battery of the present invention in which the control electrode is electrically connected to the positive electrode, the negative electrode may have advantageously a lower capacity than the positive electrode, whereby the positive electrode has a "charge reserve" as the means for suppressing the development of oxygen during the charging. In this embodiment of the storage battery cell, the control electrode may advantageously contain a known catalyst for the oxidation of hydrogen, the catalyst being preferably platinum.

In another embodiment of the storage battery cell of the present invention, the control electrode is electrically connected with the negative electrode, whereby the positive electrode has a "charge reserve" and the negative electrode has a lower capacity than the positive electrode. In this embodiment of the storage battery cell of the invention, the admission of oxygen to the control electrode from the positive electrode is prevented by a high charge reserve of the positive electrode.

In still another embodiment of the storage battery cell of the present invention, the control electrode is electrically connected to the negative electrode, the negative electrode has a lower capacity than the positive electrode, and th control electrode is enveloped by a separator which is impermeable to gas.

In a further embodiment of the storage battery cell of the present invention, the control electrode is electrically connected with the negative electrode, whereby the negative electrode possesses a charge reserve and an antipolar addition, while the positive electrode possesses a discharge reserve which is smaller than the oxidation capacity of the antipolar constituent of the negative electrode. Also in this embodiment of the storage battery cell of the invention, the control electrode contains advantageously a catalyst, which is preferably platinum.

In a further embodiment of the storage battery cell of the present invention, the control electrode is electrically connected, over an automatically operative switch, with the positive electrode during the charging cycle and to the negative electrode during the discharging cycle, whereby the negative electrode contains a charge reserve and the positive electrode contains antipolar mass or a discharge reserve, the amounts of these additives being so regulated that the positive electrode contains more reducible constituents than the negative electrode contains oxidizable constiuents.

In another embodiment of the storage battery cell of the present invention, the control electrode is electrically connected, over an automatically operative switch, with the negative electrode during the charge cycle, and with the positive electrode during the discharge cycle, whereby the negative electrode contains a charge reserve and the positive electrode contains antipolar mass.

While the specific embodiments of the storage battery cell described hereinbefore contain only a single control electrode, the following two embodiments contain two control electrodes. In one embodiment thereof one of the control electrodes is electrically connected to the positive electrode and the other control electrode is electrically connected to the negative electrode, whereby the negative electrode contains a charge reserve and the positive electrode contains an antipolar additive.

In the second embodiment of the storage battery cell of the present invention containing two control electrodes, one control electrode is likewise electrically connected to the positive electrode and the other control electrode is electrically connected to the negative electrode, whereby the positive electrode contains a charge reserve and the negative electrode contains a discharge reserve.

For long life and durability of the storage battery cell of the invention, the control electrode preferably consists of a material which is not attached under the operating conditions of the storage battery cell. Most advantageously the control electrodes consist of an electrically conductive foil, sintered layered material or a layer of a web. The control electrodes may advantageously be arranged between a positive and a negative electrode. Or, if desired, the control electrode may be arranged at the outside of a plate pack or stack of electrodes. The control electrode may also be electrically connected to the electrically conductive housing, which in this case is insulated from the set of plates. If desired, the housing of the storage battery cell of the invention may serve as the control electrode.

The present invention concerns also a switching device or circuit for the control of the charging of a storage battery over a storage battery cell, which contains at least one control electrode in accordance with the present invention. The storage battery contains a cell which contains a control electrode, and, during the charging cycle an adjustable resistor is electrically connected between the positive or negative main electrode of the storage battery and the control electrode. As a result, towards the end of the charging cycle a potential establishes itself at the said resistor, and the potential is applied over a potential divider to a sensitive switching element so that, as soon as this predetermined activation potential is exceeded, electrical or electromechanical switches are activated which interrupt or reduce the charge current.

A similar circuit may be employed in the above described embodiment of the storage battery of the invention for the discharging cycle. In such a case, the control electrode is electrically connected during the discharge of the battery, over an adjustable resistor, to one of the main electrodes of the battery cell containing the control electrode. As a result, a voltage drop occurs at the said resistor toward the end of the discharge cycle and the voltage drop is applied over a voltage divider to a sensitive switching element, so that, when the predetermined effective switching voltage is exceeded, switches are actuated which interrupt or reduce the discharge current.

The charge control circuit, described hereinbefore, comprises advantageously a transistor relay which becomes operative when the critical, predetermined charge voltage is exceeded. As a result, the said transistor relay switches on a current surge relay, the working terminal of which carries the operation of the relay, which switches off the charging cycle, connects the resistor and changes the polarity of the inlet side of the transistor relay.

The discharge control circuit, described hereinbefore, comprises advantageously a switch for the electrical connection of the consumer, which discharges the storage battery, whereby at the end of the discharge cycle a transistor relay becomes activated, causing a relay to be without current, resulting in the change of the storage battery circuit to "charge."

The invention is illustrated by way of example in FIGS. 1 to 19 without being limited thereto.

FIGS. 1, 1a, 3, 3a, 5, 7, 9, 11, 13, 15, and 17 each are schematic representations of the capacities and states of charge of the main electrodes and of the control electrode. In these figures the negative electrode is designated with the numeral 1, the positive electrode with the numeral 3, and the control electrode with the numeral 5.

The resistor 6 shown in these figures serves as an illustration of the electrical connection between the main electrodes and the control electrode. The course of the potential at resistor 6 during the charge cycle and the discharge cycle, respectively, is represented in FIGS. 2, 4, 6, 8, 10, 12, 14, 16, and 18. The values for the potential or voltages given in these diagrams are given by way of example and all refer to alkaline storage batteries. Similar tendencies and performance are applicable for lead storage batteries.

The switching device or circuit, which is to be connected to resistor 6 for the cutting off of the charging or discharging cycles, respectively, is shown in FIG. 19.

FIG. 1 shows schematically the electrodes and the distribution of the capacities in a gas-tight nickel-cadmium cell having an alkaline electrolyte of the type known per se. The negative electrode 1 has a charge reserve 2, in order to prevent the hydrogen generation during the charging. The positive electrode 3 contains an antipolar mass 4. Between both electrodes is arranged control electrode 5. This control electrode consists, for instance, of a thin sheet-like piece of nickel, of a web from nickel wire or from a thin structure of sintered nickel. Instead of using nickel or other metallic conductor for the construction of the control electrode, one may use also any other conductor that is resistant to the electrolyte. The control electrode in FIG. 1 is imbedded in two layers of an electrolyte-resistant separator of the commonly used kind. The separator is not specifically shown in the drawing.

The control electrode 5 is connected over resistor 6 with positive electrode 3. If a cell, which is constructed in the above described manner, is charged, initially no current or only a very small current flows over resistor 6. The very small current may be caused by a partial oxidation of the nickel of the control electrode or by an initially insignificant generation of oxygen at this electrode. The situation does not appreciably change when later on a still weak generation of oxygen takes place. Only when the positive electrode has been charged to the point that nearly all the current supplied for the charge serves to generate oxygen, does the current flowing through resistor 6 increase spontaneously. The increase of the current flowing through ressitor 6 produces an increased drop of the potential at resistor 6, which drop is caused by the oxygen generation at the control electrode which now begins. This increased drop of the potential at resistor 6 can be utilized for the control of a switching device or circuit, respectively, which cuts off or reduces the charge current. The resistor can be regulated to within wide ranges as of 10 to 500 ohms.

The current flowing as a result of the generation of oxygen between the positive electrode and the control electrode is practically independent of the temperature of the cell, if one maintains the charge current constant. If the charge current increases as a result of an increase if the temperature of the cell, the current flowing between the positive electrode and the control electrode increases with a resultant increase of the voltage drop at resistor 6. As stated before, this voltage drop is utilized in accordance with the present invention for the timely interruption or reduction of the charge current.

During the discharge of the cell, the control electrode has at first practically the same potential as the positive electrode because at this point no electro-chemical reaction takes place at the control electrode. However, if the discharge of the cell is continued until the negative electrodes are exhausted and until the cell is reversed in its polarity as a result of the exhaustion of the negative electrode, the generation of oxygen begins at the electrode which was originally negative. At the same time at the electrode which was originally positive (electrode 3), the antipolar addition 4 is charged, i.e., reduced. The oxygen generated by the electrode which was originally negative (electrode 1) passes again to control electrode 5, which is now connected as an oxygen-reducing electrode against antipolar additive 4 of electrode 3, whereby the partially reduced antipolar additive 4 determines the potential of the originally positive electrode 3. During the discharging of the cell accordingly, the situation is exactly opposite to that prevailing during the charging cycle. The originally negative electrode (electrode 1) takes over the function of the oxygen-generating electrode, and the originally positive electrode (electrode 3) takes over the function of the electrode which was negative in the charging cycle, while the control electrode reacts to oxygen reduction in the discharging cycle instead of to oxygen generation as in the charging cycle.

As a result of the oxygen reduction and of the increase of the potential between the control electrode and the main electrode, a current flows in resistor 6. The drop of the potential caused thereby at resistor 6 is now used indirectly for the shutting off of the discharge current flowing during the discharge and/or extended discharge, respectively.

In the cell illustrated schematically in FIG. 1a the negative electrode comprises in addition discharge reserve 7. The discharge reserve has the effect that at a deep discharge the generation of oxygen begins only when already part of the antipolar addition 4 at positive electrode 3 has been reduced. In this manner the time period passing between the generation of oxygen until the interruption of the discharge is still further shortened, with the result that the pressure of the oxygen generated in the cell is reduced. Thus, this modification of the cell of the invention serves to increase the reliability and safety of operation of a gas-tight cell in accordance with the invention.

FIG. 2 shows for the modification of the cell illustrated in FIG. 1 the direction and its relation to time of the potential between the control electrode and the positive electrode by way of example of the data obtained in a gas-tight alkaline storage battery. Curve $a$ represents the potential during discharging and curve $b$ during charging, $t$ being time. The control electrode is thereby negative against the positive electrode during the charging cycle, and positive against the antipolar addition of this electrode during the discharge cycle. The values of potentials shown in FIG. 2 are those of gas-tight alkaline storage batteries. They are approximate values and are among others dependent on the size of resistor 6, the strength of the discharge current and of the charge current, as also on the construction of the cell and on the nature and type of the control electrode.

FIGS. 3 and 3a schematically illustrate a cell having the same arrangements of electrodes and distribution of capacities as FIGS. 1 and 1a. The cells of FIGS. 3 and 3a, however, differ by the fact that control electrode 5 is connected over resistor 6 with negative electrode 1. In this case, the oxygen generated toward the end of the charging cycle at positive electrode 3 passes to the control electrode, which operates in this case as an oxygen reducing electrode, i.e., as a cathode. The increase in the potential at resistor 6 resulting from the flow of current through resistor 6 is utilized for the limitation of the charge, i.e., for the interruption of the charge current or for its reduction by use of a suitable switch device or circuit, respectively.

At the end of the discharge, and at the start of reversal of the polarity of the electrodes, oxygen is generated at originally negative electrode 1 and consequently also at control electrode 5. This results, as has been described in connection with FIGS. 1, 1a, and 2, in an increase of the potential at resistor 6. This increase of the potential actuates over a suitable switching device or circuit the interruption of the discharge current. In FIG. 3, the functions of the control electrode in the charging and discharging cycles are accordingly reversed in contrast to the situation described in FIG. 1.

Instead of an antipolar addition 4, positive electrode 3 may also contain a discharge reserve.

FIG. 4 shows the course of the potential of the control electrode against the negative electrode plotted against time $t$ in a cell having the construction shown in FIG. 3. Curve $b$ was obtained during the charge, and curve $a$ during discharge. In accordance with the reversed functions of the control electrode, the potentials are also reversed, i.e., the potential $a$ during discharge is negative, and the potential $b$ during charge is positive, against the negative electrode 1.

FIG. 5 shows in schematic representation a storage battery cell containing a control electrode in an arrangement as it is likewise suited for gas-tight cells. Negative electrode 1 with charge reserve 2 contains also discharge reserve 7. Positive electrode 3 contains no antipolar addition. The capacity of the cell is limited by positive electrode 3. Control electrode 5, which is connected over resistor 6 with positive electrode 3, has a small capacity. This is usually achieved by the surface oxidation of the metallic surfaces of control electrode 5 during the charge cycle. At the end of the charge cycle oxygen is generated at control electrode 5, as has been described hereinbefore in connection with FIGS. 1 and 1a. The increase of the potential at resistor 6 connected therewith is used for the control of the charge current.

At the end of the discharge cycle the potential of positive electrode 3 decreases rapidly while control electrode 5 is holding its potential for a certain length of time as a result of the nickel oxides contained on its surface. This causes at control electrode 5 a positive potential against positive electrode 3. The potential differential lying across resistor 6 interrupts the discharge current by means of a suitable switching device or circuit.

It was found that in the above described arrangement reisistor 6 should be selected to be as large as possible in order to load the low capacity control electrode as little as possible. By means of an additional switching device it is possible to automatically substitute, when the battery is switched from charging to discharging, resistor 6 by one having a higher capacity.

This system can be employed advantageously in all those situations where a deep discharge or a change of polarity of the cell would lead to irreversible electrode operations, as in lead storage batteries where this system is especially useful. With this system the discharge is actually interrupted before the potential of the cell falls to zero.

Taking a gas-tight alkaline storage battery as example, FIG. 6 shows the course of the potential between control electrode 5 and positive electrode 3 of a cell in accordance with FIG. 5, plotted against time, curve b being obtained in the charging cycle and curve a in the discharge cycle. The general course of the potential in relation to time is principally the same as that shown in FIG. 2; however, with the difference that the potential differential is, in the discharge cycle, smaller by one order of magnitude.

FIG. 7 represents a system in which the control electrode, which operates bifunctionally in accordance with the invention, is preferably restricted to a single function by controlling only the charge cycle by help of the control electrode.

Negative electrode 1 has a smaller capacity than positive electrode 3, which comprises also charge reserve 10. The charge reserve serves in this case for the suppression of the oxygen generation during charging. Control electrode 5 has the task of oxidizing hydrogen and may for this purpose contain advantageously a catalyst for hydrogen oxidation, e.g., platinum. Control electrode 5 is connected over resistor 6 with positive electrode 3. After completion of the charging of the negative electrode, hydrogen is generated thereon which passes to the catalyst of the control electrode, which is now acting as the hydrogen oxidizing electrode against the positive electrode.

As a result of the charge reserve of the positive electrode, oxygen is not yet generated at the control electrode. Such oxygen generation at the control electrode would impede the oxidation of the hydrogen. As a result of the hydrogen oxidation at the control electrode a potential difference establishes itself at resistor 6, which may be used for the control of the charge current as described above.

FIG. 8 shows the course of the potential in relation to time between the control electrode and the positive electrode during the charging. The potential b is plotted against time t. The above described system is suitable for alkaline storage batteries as well as for lead storage batteries. Depending on the nature of the battery, there will be selected a suitable material for the electrodes and for the catalysts, in accordance with the principles generally applied with the known materials for such batteries.

Even though the system in the cell described in connection with FIG. 7 uses only the function of the control electrode during the charging cycle, one may also utilize the same control electrode 5 for the control of the discharge cycle. The electrode operates in this case as a bifunctional electrode by being used, for example, for the hydrogen generation or oxygen reduction. In the latter case, positive electrode 3 contains preferably a discharge resevre for preventing the generation of hydrogen in the case of deep discharge with the reversal of the polarity.

FIG. 9 represents an arrangement which is used preferably for open cells or for such cells which require little service. Negative electrode 1 comprises a smaller capacity than positive electrode 3, which may have a charge reserve 10. Control electrode 5 is connected with negative electrode 1 over resistor 6. After completion of the charge of the negative electrode, hydrogen is generated thereon. At this point there begins also hydrogen development at the control electrode. It is important to prevent access of oxygen to the control electrode because the latter would, in the presence of oxygen, operate as an oxygen-reducing electrode against the negative electrode, thus undesirably reducing the potential differential against this electrode. To prevent access of oxygen there is provided a correspondingly high charge reserve 10 in the positive electrode; this prevents a premature development of oxygen. Oxygen may also be prevented from reaching the control electrode by surrounding the control electrode in known separators which are impermeable to gas. With the latter arrangement, positive electrode 3 need not contain a charge reserve 10. The voltage drop occurring at resistor 6 at the beginning of gas generation at the control electrode is utilized for the limitation of the charge. At the start of a deep discharge or with the change of polarity of the cell, the originally negative electrode 1, and thus also the control electrode, generate oxygen. The potential differential establishing itself thereby at resistor 6 effects the interruption of the discharge cycle.

FIG. 10 shows the course of the potential, in relation to time, between the control electrode and negative electrode 1 in a cell arrangement as just described and illustrated in FIG. 9. The curve obtained in the charge cycle is designated by the letter b and that obtained in the discharge cycle is designated by the letter a, t being time.

FIG. 11 illustrates a system in which the negative electrode 1 contains a charge reserve and an antipolar addition 11. Control electrode 5 may contain, as in the cell described in FIG. 7, a catalyst for the hydrogen oxidation. Control electrode 5 is connected over resistor 6 with negative electrode 1. Positive electrode 3 contains a discharge reserve 8 comprising a conventional mass used for this purpose. After completion of the charge of positive electrode 3, it generates oxygen which passes to control electrode 5, which then operates as an oxygen-reducing electrode by being connected to negative electrode 1. The voltage drop occurring thereby at resistor 6 is used for interrupting the charging cycle. At the start of the deep discharge or at the reversal of the polarity of the cell, as a result of the exhaustion of the discharge reserve or the mass of negative electrode 1, antipolar addition 11 of the originally negative electrode 1 is charged, i.e., oxidized. After exhaustion of the discharge reserve of positive electrode 3, the latter begins to generate hydrogen which passes to the control electrode. The control electrode operates now as an electrode which oxidizes hydrogen and which operates now against the negative electrode with its at least partially oxidized antipolar additive. The voltage drop resulting therefrom at resistor 6 causes the interruption of the discharge cycle by means of suitable switching devices or circuits, respectively. The advantage of this system is the creation of a relatively large potential increase at the end of the charging and discharging cycles.

FIG. 12 shows the course of the potential at resistor 6, plotted against time, a being the curve obtained in the discharge cycle and b being the curve obtained in the charge cycle; t being time. The curves were obtained in a cell arrangement as described in connection with FIG. 11.

In the various arrangements of the invention described so far, only a single control electrode has been used, which is connected with one of the two electrodes, i.e., either with the positive or with the negative electrode.

In accordance with the present invention it is, however, also possible to arrange the control electrode in such manner that a single control electrode is connected, by means of a preferably automatically operative switch, during the charge cycle with the electrode of one polarity and during the discharge cycle with the electrode of the opposite polarity, with the insertion in each case of resistor 6.

Such arrangement is illustrated in FIG. 13. It is apparent that this arrangement is a combination of the arrangement in accordance with FIG. 1 as far as the positive electrode is concerned, and of that in FIG. 3, as far as the negative electrode is concerned.

Control electrode 5 may be employed in this circuit in connection with switch 9. The control electrode operates also here as a bifunctional conrtol electrode, in the following manner:

In the case of a gas-tight closed storage battery, for instance, a gas-tight closed nickel-cadmium storage battery, negative electrode 1 contains charge reserve 2 and positive electrode 3, a discharge reserve 8 or antipolar mass 4, depending on which function control electrode 5 is intended to fulfill in the deep discharge with reversal of the polarity.

In the charge cycle, control electrode 5 may be connected over resistor 6 by switch 9 with positive electrode 3. In this case, the control electrode operates as an oxygen-generating electrode. The current, flowing through resistor 6 as soon as the oxygen generation at control electrode 5 begins, causes at the resistor a voltage drop, which can be used for switching purposes, i.e., in accordance with the invention for the interruption or for the connection or disconnection of the charge current. It is, on the other hand, also possible with the same arrangement to connect control electrode 5 by means of switch 9 with negative electrode 1 during the charging cycle of the cell. In this case, control electrode 5 operates, as in the cell in FIG. 3, as an oxygen-reducing electrode. Accordingly, the same potential relationship is established as in FIG. 6.

If it is intended to operated control electrode 5 at deep discharge with the reversal of the polarity as an oxygen-reducing electrode, positive electrode 3 contains preferably antipolar mass 4, and the control electrode is connected by switch 9 with positive electrode 3. In this case, the same situation applies as is described for the positive electrode in connection with FIG. 1 or FIG. 1a, respectively, whereby antipolar mass 4 provides for a favorable potential relationship.

If it is, however, intended to operate control electrode 5 at deep discharge with the reversal of the polarity, as an oxygen-generating electrode, control electrode 5 is connected by switch 9 with negative electrode 1. Positive electrode 3 contains in this case antipolr mass 4 or discharge reserve 8, so that the generation of hydrogen at the originally positive electrode and at the control electrode is suppressed. The antipolar mass is to be proportioned in this case so that the positive electrode contains more reducible components than the negative electrode contains oxidizable components.

In the case, where it is intended to operate the control electrode in accordance with FIG. 13 as an oxygen- generating electrode in the charge and in the discharge cycles, the control electrode is connected over switch 9 with positive electrode 3 during the charge cycle and with negative electrode 1 during the discharge cycle. The time relationship of the potential at resistor 6 is represented in FIG. 14, wherein curve b represents the potential during the charge cycle and curve a during the discharge cycle plotted against time. The voltage droy may be utilized to actuate the switching in a manner as described hereinbefore. If it is desired that the control electrode operates as an oxygen-reducing electrode, the control electrode is connected over switch 9 with negative electrode 1 during the charge cycle and with positive electrode 3 during the discharge cycle.

The present invention comprises also a further embodiment of the system described in connection with FIG. 13, in which the development of hydrogen is used for actuating the charge and discharge operation, respectively. In this case, it is required that control electrode 5 be connected over switch 9 with negative electrode 1 during the charge cycle. The control electrode must thereby be protected from the access of oxygen, which is generated at the positive electrode, by surrounding it in a gastight layer, or alternatively by giving the positive electrode a charge reserve.

To use the hydrogen generation in the deep discharge with the reversal of polarity, it is required to connect control electrode 5 with originally positive electrode 3. In this case, negative electrode 1 has preferably a discharge reserve 7 for suppressing the generation of oxygen, or, in the alternative, the control electrode must again be protected from oxygen by surrounding it or the like, as described hereinbefore. Positive electrode 1 has in this latter case advantageously no discharge reserve 8 nor any antipolar mass 4, respectively.

Furthermore, it is also possible to use the hydrogen oxidation at the control electrode for switching control purposes as described hereinbefore. For this purpose, control electrode 5 is connected with positive electrode 3 during the charge cycle. In order to prevent the generation of oxygen at the control electrode during the charging cycle, positive electrode 3 preferably contains in this case a charge reserve 10.

For using the oxidation of the hydrogen during the deep discharge with the reversal of the polarity, control electrode 5 is connected to originally negative electrode 1, which now has preferably a discharge reserve 7, in order to prevent a premature generation of oxygen at the control electrode. A control electrode in the function of a hydrogen-generating or hydrogen-oxidizing electrode, respectively, is especially suited for the control of the progress of the charge and discharge processes of open-operated cells.

A control electrode which generates oxygen may also be used in open-operated cells, if the electrode is adequately protected against the access of hydrogen. It is thereby necessary to connect, in accordance with the principles discussed in connection with FIG. 13, the control electrode with positive electrode 3 during the charge cycle, and with originally negative electrode 1 during the discharge cycle and at deep discharge with the reversal of polarity. In this case, it is with respect to the function of the control electrode, regardless of whether or not the positive electrode contains a discharge reserve or antipolar mass, respectively.

The hereinbefore described systems or arrangements of the invention for use of a bifunctional control electrode in an open or gas-tight operated storage battery cell and in the cells which require little service, i.e., of a control electrode, which serves for the initiation of the control of the charge and of the discharge cycles, contain only a single control electrode. As explained hereinbefore, in these systems this single control electrode is permanently connected to an electrode of one polarity, or it may be alternatingly connected with one or the other electrode by switch means.

However, the invention is not limited thereto. The invention comprises also the embodiment of the storage battery cell wherein a pair of control electrodes having a binary function is used instead of a single bifunctional electrode.

In this embodiment of the storage battery cell of the invention, there is provided an arrangement in which two control electrodes which are connected to the regular electrodes can be utilized for control purposes in the charge cycle as well as also in the discharge cycle or deep discharge with the reversal of polarity, whereby a given control electrode is always connected to the same regular electrode.

Such arrangement is illustrated in FIG. 15. This arrangement is useful for gas-tight enclosed storage batteries with, for instance, the known electrochemical systems cadmium-nickel hydroxide, silver oxide-cadmium, silver oxide-zinc.

Negative electrode 1 contains a charge reserve 2 and is connected over resistor 6a with control electrode 5a. Positive electrode 3 contains an antipolar addition 4 and is connected over resistor 6b with control electrode 5b.

In the charge cycle of this gas-tight enclosed system, oxygen is generated first at the positive electrode, while the generation of hydrogen is prevented at negative electrode 1 by the charge reserve. Control electrode 5b operates, as described hereinbefore, as an oxygen-generating electrode. At the same time control electrode 5a has the function of an oxygen-reducing electrode.

When the generation of oxygen begins, a potential difference establishes itself over each of resistors 6a and 6b, as described hereinbefore. The absolute value of the potential differences corresponds approximately to that of the cells shown in FIGS. 1 and 3. Accordingly, there is also a potential differential between point c at control electrode 5a and point d at control electrode 5b, which has an absolute value that lies between the values of the potential drops across the two resistors 6a and 6b. If one assumes, for instance, a charge voltage of about 1.5 v., and if one assumes a potential of 800 mv. across resistor 6a and a potential of 100 mv. across resistor 6b, the potential difference between the two points c and d is about 700 mv. This potential difference is then utilized, by means of switch or circuit members having a high ohmage, for controlling the charge current, e.g., by the interruption of the charge current or by changing the current to a lower value. The switch member contains thereby a minimal switch, which initiates the switching when the potential drops below a lower limiting value. This is contray to the arrangements described hereinbefore, wherein the switching was initiated when the potential reached a given maximum value.

In the discharge cycle or at deep discharge with the reversal of the polarity, respectively, the functions of the control electrodes are reversed in accordance with the effect of the bifunctional control electrodes. Control electrode 5b, which is connected to originally positive electrode 3, becomes now the oxygen-reducing electrode. Control electrode 5a, which is connected to originally negative electrode 1, becomes now an oxygen generating electrode. Between point c and point d, the same potential difference establishes itself as in the charge cycle. However, the potential difference is now of reversed sign. This potential difference may again be utilized in the same manner, as the potential difference establishing itself in the charge cycle, for the control of the discharge current, e.g., by interrupting the discharge current.

The time relationship of the potential difference between points c and d is shown in FIG. 16, curve a showing the potentials in the charge cycle and curve b in the discharge cycle t being time. In view of the foregoing discussion, this representation need not be described further.

It is also possible, in accordance with the present invention, to oxidize the hydrogen which is generated during the charging by the use of suitably designed control electrodes. The same principle, i.e., the oxidation of the hydrogen, may also be employed in the discharge cycle and for deep discharge with the reversal of the polarity. The arrangement of the control electrodes is thereby in principle the same as that shown in FIG. 15. The relative adjustment of the capacities of the positive and negative electrodes, however, differs in this embodiment of the invention, which is schematically illustrated in FIG. 17. There positive electrode 3 contains a charge reserve 10 and negative electrode 1 a discharge reserve 7. In the charge cycle hydrogen is generated at control electrode 5a, which is oxidized at control electrode 5b. In the discharge cycle, the situation is reversed; hydrogen is now generated at control electrode 5b and hydrogen is oxidized at control electrode 5a. In this arrangement, a drop of the potential establishes itself across resistors 6a and 6b, as described hereinbefore with respect to the single control electrode arrangements. Between point c and point d a potential difference can be detected and utilized for switching purposes, as described hereinbefore.

The course of the potential difference is illustrated in FIG. 18, curve b being the potential difference in the charge cycle and curve a being the potential difference in the discharge cycle plotted against time t.

It is also possible, in accordance with the present invention, to connect each of the two electrode polarities with a permanently coupled control electrode each, whereby the functions of these control electrodes are only partially used, viz., utilizing one function of one control electrode in the charge cycle and one function of the other control electrode in the discharge cycle or for deep discharge with the reversal of the polarity, respectively. In this embodiment of the invention, the potential required for the control of the charge or discharge cycle, respectively, is taken across resistor 6a or resistor 6b, respectively. For example, in the arrangement of FIG. 15, control electrode 5a may in this manner control the charge cycle by acting during the charge as an oxygen-reducing electrode, or, if desired, the charge cycle may be controlled by electrode 5b, which acts in this case as an oxygen-generating electrode. In the discharge cycle, control electrode 5a takes over control as an oxygen-reducing electrode. On the other hand, during discharge control electrode 5a operates as the oxygen-generating electrode, the same as control electrode 5b does during the charge cycle. In a full charge-discharge cycle thus in each case, the control electrode which is connected with a regular electrode cooperates with the control electrode which is connected to the other regular electrode, and both operate in each case as oxygen-generating or as oxygen-reducing electrodes.

The capacity relationship corresponds in thase case to that illustrated in FIG. 15. In a suitably changed arrangement, utilizing the capacity relationship illustrated in FIG. 17, it is also possible to control the charge cycle with one of the control electrodes of the pair of control electrodes, and to control the discharge cycle with the other control electrode in such manner than these control electrodes are operative either as hydrogen-oxidizing of as hydrogen-generating electrodes.

The use of a pair of control electrodes in accordance with the present invention is also possible for open-operated storage batteries or for storage batteries which require little service. In this case, as in the operation of the control electrodes in pairs, the hydrogen generation at negative electrode 1 in the charge cycle or at originally positive electrode 3 in the discharge cycle or deep discharge with polarity reversal, respectively, may be utilized for switching purposes and for the control of the charge and discharge cycle. In the alternative, the oxypen generation at positive electrode 3 in the charge cycle or at orginally negative electrode 1 in hte discharge cycle or deep discharge with pole reversal may be used for the same purposes.

Furthermore, it is also possible, in a suitable adaptation of the foregoing arrangement, to use for the desired charge and discharge control and switching purposes, in the charge cycle the control electrode which is connected to one of the electrodes and in the discharge cycle the control electrode which is connected to the other electrode. In this case, both electrodes fulfill the same functioin, i.e., either oxygen or hydrogen is generated at both of these control electrodes. The potential difference which is detected over resistors 6a and 6b can then be utilized for the control of the charge and/or discharge cycles in the manner described hereinbefore.

The control electrodes should be insulated against the regular electrodes. Their arrangement within the cell may then be effected in the same manner as is described hereinafter for the individual control electrodes.

It is very important to take precautions to protect the hydrogen-generating electrodes from the access of oxygen and, vice-versa, to protect the oxygen-generating electrodes from the access of hydrogen, in order to prevent a depolarization.

In the examples of the arrangement of a bifunctional control electrode, which have been discussed hereinbefore, the control electrode was preferably arranged between a regular positive electrode and a regular negative electrode. If the cell housing is made from metal and if the housing is insulated against the set of plates or electrodes, the control electrode may be electrically connected to the cell housing. By this expedient, a simple possibility for the connection of the control electrode is provided. In this case, it is also possible to use the cell housing proper as the control electrode, preferably as a hydrogen-oxidizing or oxygen-reducing control electrode.

Furthermore, it is also possible to arrange the control electrode at the outside of the plate pack, i.e., between a wall of the housing of the cell and one of the outside-lying electrodes. If the housing is made of a metal, it is preferred that the control electrode be insulated by suitable separators against the housing and the neighboring electrode. Depending on the function which is intended for the control electrode, the control electrode is then connected with the positive or negative terminal of the cell over a suitable resistor 6. In this case it is advantageous to arrange an oxygen-reducing electrode next to a positive electrode and a hydrogen-oxidizing electrode next to a negative electrode.

As was emphasized in the foregoing detailed description, the systems in accordance with FIGS. 1, 1a, 3, 3a, 5, 7, 9, 13, 15, and 17 are suited for gas-tight enclosed storage batteries. The systems in accordance with FIGS. 7 and 9, and in suitably modified from the systems in accordance with FIGS. 13, 15, and 17, may be used for the control of cells of open design. In the same manner, storage batteries which are designed to operate with a minimum of service may be controlled by a suitable selection of the system of the control electrode.

The curves of the potential-time relationships which are presented in FIGS. 2, 4, 6, 8, 10, 12, 14, 16, and 18 and of the potential drops across resistor 6, i.e., the potentials of the control electrodes against the regular electrodes, with which they are connected or against the second control electrode, respectively, are to be considered merely as example. They do not represent generally applicable absolute values, because these values depend on many factors, such as the size of the electrode, the amount of the charge current, the temperature of the cells, etc. All of the values of the potentials given herein apply to and were obtained in alkaline cells.

The direction of the potential against the regular electrode can be derived from the particular electrical connection of the control electrode and the current direction in the described electrochemical reaction at the control electrode.

The bifunctional control electrode of the present invention is not only useful for the control of the charge and discharge cycle of a single cell. If several cells are combined to a storage battery unit, it is not required to provide each cell of the battery with a control electrode. In this case it is sufficient to provide a single cell or a fraction of the cells of the battery with a control electrode. If the battery unit contains several cells which comprise a control electrode, the circuit may be designed so that where a control electrode is not working satisfactorily or where a control electrode is not working at all, another control electrode takes over the switching function for the battery. This expedient results, as can be readily seen, in an increased reliability and life of the battery.

FIG. 19 shows schematically a circuit or switching device, respectively, which may be used in accordance with the invention for the control of the charge and discharge currents, respectively. The switching device is controlled by a cell of the storage battery as described hereinbefore. The circuit or switching device shown in FIG. 19 may be used with any of the arrangements illustrated in FIGS. 1 to 18.

The illustration of the circuit, as represneted in FIG. 19, shows the switching device in the state it is during the charging cycle of the storage battery. The battery charger 11 is connected over switch contact 14' of the relays 14 over contact 12 with storage battery 15 which is to be charged. The first cell of this storage battery possesses a control electrode 5, which is, as is illustrated in the preceding FIGS. 1 to 18, connected over resistor 6c and switch contact 14'' and contact 19, respectively, with positive electrode 3 of the first cell. The resistor can be adjusted over a wide range, so that the subsequent switching members may be adjusted to the control electrode, if different charge currents and cell designs are used.

The potential which causes the initiation of the control function for the limitation of the charge current is preset over potentiometer 21 and is lead over switch contacts 14''' and 14'''' of relay 14 to the entrance side of the transistor relay 30. The transistor relay has a high activation sensitivity which is, for instance, around about 10 mv. Because of the small potentials which establish themselves at resistor 6c, the very sensitive transistor relay is especially useful as a switching element in the device of the invention.

As soon as the activaton potential, which has been preset at potentiometer 21 for the termination of the charge, has been reached, the transistor relay becomes activated, and this results in the closing of contact switch 31. This results in the activation of the relay 40, which is activated by a surge of current and which actuates relay 14 over its contact 40'. Thereby relay 14 receives current and its contacts 14', 14'', 14''', and 14'''' are switched. As a result of these switching actions, the switch contact 14' is connected with contact 13, which means that storage battery 15 is disconnected from charger 11 and is now connected to volt meter 16, which indicates that the battery is ready for discharge. Over switch 18 electrical consumer 17 may be connected with storage battery 15. As a result of the simultaneous switching of all contacts of relay 14, resistor 6d is furthermore positioned between control electrode 5 and the positive terminal of the first cell of storage battery 15 over switching contact 14''. This resistor is likewise adjustable and can be set so as to adapt the subsequent switching members to the control electrode for various discharge currents and cell designs. Potentiometer 24, which is now activated over switch contact 14''' and contact 23, respectively, serves for the setting of the activation potential initiating the control of the discharge current.

Since in most of the above examples the polarity of the potential between the control electrode and the main electrode changes its direction at the end of the charge cycle and dscharge cycle, respectively, while transistor relay 30 is activated only by a potential in one direction, a polarity reversal switch is automatic over switch contact 14'''' of relay 14, which is connected during the discharge cycle with contact 26 and during the charge cycle with contact 25.

As soon as the activation potential, which has been preset for the termination of the discharge cycle, has been reached, transistor relay 30 is again activated, its switch 31 closes, current surge relay 40 is activated, its contact 40' is opened, and relay 14 is disconnected. This results in the reconnection of storage battery 15 to battery charger 11, and the storage battery is now again charged.

The various relays, used in the just described circuitry, may be replaced by suitable transistors or controllable diodes, if it is desired to avoid mechanical switches at all.

The circuit, described in the foregoing, permits in simple manner to limit or control, respectively, the charging as well as also the discharging of any desired storage battery containing at least one control electrode.

The bifunctional control electrodes of the present invention are, in suitable adaptation, suitable for the open-operated battery types, for those requirng little service, for the types requiring no service and for the gas-tight enclosed types of all known electro-chemical systems, for instance of the electrochemical systems operating with alkaline electrolytes, such as nickel hydroxide/cadmium, silver oxide/cadmium, nickel hydroxide/zinc, silver oxide/zinc, as well as of the electrochemical system lead dioxide/lead which operate with sulfuric acid electrolyte.

Until now, charging of open or gas-tight cells normally extended over longer periods of time. Using the present invention, it is now possible to charge up storage battery cells in short periods of time, e.g., in 1 to 2 hours. Or, if a supplementary charge is required in the case of an unknown state of charge, the supplementary charge may be completed in shorter periods of time than before. The danger of overcharging or of a damaging heating up of the storage battery is avoided. Thus, the use of the storage battery cell of the present invention, containing at least one control electrode, makes it possible to replace the heretofore generally used slow extended charge cycle by a rapid charge. This results in a substantial rationalization of the charging process. It is likewise possible to charge and discharge a cell, which comprises at least one control electrode in accordance with the invention in frequent alternation, without danger that the cell be damaged. The principles and process of the present invention are especially useful in the control of the charge cycle and of the discharge cycle of cells and storage batteries having higher capacities.

We claim:

1. A storage battery cell which comprises in combination
    at least one negative main electrode,
    at least one positive main electrode, positioned in contact with an electrolyte and spaced apart therein by a separator, and
    at least one bifunctionally operating, electrochemically inert control electrode which is capable of oxygen- or hydrogen-generation at the end of the charging and discharging cycles, respectively, whose resistance is independent of the state of charge of the main electrode, the control electrode being electrically connected to one of the main electrodes only over an electrical impedance means, the capacity and the state of charge of each main electrode being adjusted to the function of the control electrode, the control electrode being of a potential different from that of the main electrode and being electrochemically polarized at the end of each charging or discharging cycle by evolution or suppression of gas, and the difference in potential which is established between the main electrode and the control electrode across the electrical impedance means, actuates the control of the charge or discharge cycle of the cell of the battery at the end of the charging or discharging cycle when the over-potential is exceeded and oxygen or hydrogen, respectively, is generated at the control electrodes.

2. The cell of claim 1 which comprises in addition means which are adapted to control the charge or discharge current in response to said difference in the potential between the control electrode and the main electrode.

3. The cell of claim 1 in which the control electrode is electrically connected over said impedance means to the positive main electrode of the storage battery cell.

4. The cell of claim 3 in which the negative electrode contains at least one of the following: a discharge reserve, a charge reserve and the positive electrode contains an addition of antipolar mass.

5. The cell of claim 4 in which the discharge reserve of the negative electrode equals or is smaller than the capacity of the antipolar mass of the positive electrode to be reduced.

6. The storage battery cell of claim 3 in which the negative electrode has a lower capacity than the positive electrode, the positive electrode contains a charge reserve as a means for suppressing the generation of oxygen during the charging cycle, and the control electrode comprises a catalyst for the oxidation of hydrogen.

7. The cell of claim 6 in which the control electrode comprises platinum as a catalyst for the oxidation of hydrogen.

8. The cell of claim 1 in which the control electrode is electrically connected over said impedance means to the negative electrode of the storage battery cell.

9. The cell of claim 8 in which the negative electrode contains a charge reserve, the positive electrode contains at least one of the following: an additional of antipolar mass, a discharge reserve and a charge reserve.

10. The cell of claim 8 in which the positive electrode contains a charge reserve and the negative electrode has a capacity which is lower than that of the positive electrode.

11. The cell of claim 10 in which said charge reserve in the positive electrode has a charge reserve high enough as to essentially prevent the access of oxygen from the positive electrode to the control electrode.

12. The cell of claim 8, wherein the control electrode is positioned within a gas impervious separator.

13. The cell of claim 9, in which the negative electrode contains a charge reserve and an antipolar addition, and the positive electrode contains a discharge reserve which is smaller than the capacity of the antipolar mass of the negative electrode to be oxidized.

14. The cell of claim 1 which comprises two bifunctional control electrodes wherein one of the control electrodes is electrically connected over said impedance means to the positive electrode and the other control electrode is electrically connected over said impedance means to the negative electrode.

15. The cell of claim 14 in which the negative electrode contains a charge reserve and the positive electrode an antipolar mass.

16. The cell of claim 14 in which the positive electrode contains a charge reserve and the negative electrode contains a discharge reserve.

17. A storage battery comprising a housing, a multiplicity of battery cells comprising a positive and a negative electrode and in contact with an electrolyte and spaced apart therein by a separator, a charge and discharge control cell having the structure defined in claim 1.

18. The cell of claim 1 in which one of the main electrodes and the control electrode connected thereto generate oxygen during the charging or discharging cycle, and the other main electrode effectively prevents hydrogen generation.

19. The cell of claim 3 in which the negative electrode has a lower capacity than the positive electrode, the positive electrode contains a charge reserve as a means for suppressing the generation of oxygen during the charging cycle, and the control electrode is free of a catalyst for the oxidation of hydrogen.

20. The cell of claim 1 in which one of the main electrodes and the control electrode connected thereto reduce oxygen during the charging or discharging cycle, and the other main electrode generates oxygen.

21. The cell of claim 1 in which one of the main electrodes and the control electrode connected thereto generate hydrogen during charging or discharging.

22. A switching circuit for the control of the state of charge of a storage battery cell comprising at least one charge and discharge control cell which comprises at least one electrochemically inert control electrode and two main electrodes of opposite polarity, and which control cell is adapted to provide a potential difference between the control electrode and a main electrode at the end of the charge cycle and/or of the discharge cycle, said switching circuit comprising, between the control electrode and each main electrode, adjustable resistor means, over which a differential in the potential establishes itself at the end of the charge cycle and/or of the discharge cycle, which difference in the potential actuates over a potentiometric means a switching means, when a predetermined activation differential in the potential at the said resistor is exceeded, which means are adapted to cause limitation in the charge or discharge current at the end of the charge or discharge cycle, respectively.

23. The circuit of claim 22 which comprisese a transistor relay, which is activated when the predetermined activation potential is exceeded in the charge cycle, said transistor relay being operatively connected to a current surge relay, which is activated by the transistor relay, and which in turn actuates a working relay, which disconnects the charge current, connects a resistor and changes the polarity of the inlet side of the said transistor relay.

24. The circuit of claim 22 which comprises a switching means for the electrical connection of the electrical consumer, which discharges the storage battery, whereby at the end of the discharge cycle the transistor relay becomes activated, causing said working relay to be off from the current, an dthe storage battery circuit to be switched to the charge cycle and the storage battery connected to the charge current.

25. A storage battery cell which comprises at least one negative main electrode, at least one positive main electrode and, connected to each main electrode, a electrochemically inert control electrode having a binary function, and said control electrodes being responsive to the state of charge of the battery cell, in which the capacity and the charges of each of the main electrodes are adjusted to the function of each of the control electrodes, the main electrodes and the control electrodes being electrically connected so that at the end of each charging and discharging cycle the drop in the potential between each one of the main electrodes and its control electrode below a predetermined lower limiting value actuates controlling means which limit or interrupt the charge or discharge current, respectively, said positive main electrode comprising an anti-polar addition and said negative electrode comprising a charge reserve.

References Cited

UNITED STATES PATENTS

| | | | |
|---|---|---|---|
| 2,131,592 | 9/1938 | Lange et al. | 136—179 |
| 2,934,580 | 4/1960 | Newmann | 136—6 |
| 2,951,106 | 8/1960 | Ruetschi | 136—24 X |
| 2,980,747 | 4/1961 | Daley | 136—6 |
| 2,988,590 | 6/1961 | Andre | 324—29.5 X |
| 3,005,943 | 10/1961 | Jaffe | 320—46 X |
| 3,080,440 | 3/1963 | Ruetschi et al. | 136—3 |
| 3,208,880 | 9/1965 | Bode | 136—24 |
| 3,258,670 | 6/1966 | Piechon | 320—6 |

OTHER REFERENCES

Proceedings of the International Symposium on Batteries at the Signals Research and Development Establishment of the Ministry of Supply Christchurch, Hauts, 21st to 23rd, October 1958.

WILLIAM M. SHOOP, Jr., Primary Examiner

U.S. Cl. X.R.

324—29.5; 320—46; 136—182